United States Patent Office 3,360,589
Patented Dec. 26, 1967

3,360,589
COPPER-PHOSPHOROUS COMPLEXES AS COLORLESS STABILIZERS FOR UNSATURATED POLYESTER RESINS
Karl Raichle and Hans Rudolph, Krefeld-Bockum, Germany, assignors to Farbenfabriken Bayer Aktiengesellschaft, Leverkusen, Germany, a German corporation
No Drawing. Filed May 4, 1964, Ser. No. 364,819
Claims priority, application Germany, May 9, 1963, F 39,690
3 Claims. (Cl. 260—863)

The present invention is concerned with hardenable, unsaturated polyester moulding masses stabilized by a content of copper complex compounds.

Polyester moulding masses based on unsaturated polyesters and monomeric compounds copolymerizable therewith, tend to premature gelling upon storage, especially at elevated temperatures. It is known to stabilize the polyester moulding masses against this premature gelling by the addition of various inhibitors, for example, phenols, such as hydroquinone, tert.-butyl-pyrocatechol and 4-ethyl-pyrocatechol, quinones, such as p-benzoquinone and 2,5-di-tert.-butyl-benzoquinone, certain aromatic amines, amine salts and quaternary phosphonium and arsonium salts.

The stabilizing effect of the mentioned inhibitors is, as is also already known, further improved or exceeded by soluble cupric compounds, especially cupric salts of organic acids, such as cupric naphthenate. The cupric compounds, however, have the disadvantage of being intensely coloured and cause a greenish-brown to greenish-blue discoloration of the originally colourless moulding masses, even in amounts which are not even sufficient for an effective stabilization of the polyester moulding masses. The discoloration of the moulding masses, which increases with increasing copper concentration, is already so strong even with amounts of little more than one part of copper per 1 million parts of the moulding mass, that the addition of still larger amounts of copper, which would be desirable in itself, is practically not possible because of the prohibitive discolorations connected therewith.

In order to avoid these disadvantages, it seems obvious to replace the coloured cupric compounds by colourless cuprous compounds, such as cuprous halides. It is, however, difficult to disperse homogeneously these compounds in the moulding masses since cuprous iodide, for example, is completely insoluble therein, whereas larger amounts of solubilizing agents are necessary for cuprous bromide and cuprous chloride in order to enable a sufficiently quick and uniform dissolution in the moulding masses. The amounts of solubilizing agents, such as aceto-nitrile or dimethyl formamide, necessary for this purpose are, however, so large that they frequently impair the properties of the hardened products produced from these moulding masses.

Furthermore, it has already been proposed to produce cuprous chloride-containing moulding masses by adding cuprous chloride to the starting materials for the production of the unsaturated polyesters, before the polycondensation. Since, however, cuprous chloride is very unstable at the high reaction temperatures necessary for the polycondensation, it is, when this method is used readily oxidised by oxidising compounds to cupric chloride so that discoloured products are again obtained.

We have now found that the mentioned disadvantages are avoided and outstandingly storage-stable, scarcely discoloured polyester moulding masses containing soluble copper compounds as stabilizers are obtained when, for the stabilization of the moulding masses, there are used complex compounds of cuprous chloride and/or cuprous bromide with neutral phosphorous acid esters.

The complex compounds can be added directly to the polyester moulding masses at room temperature or at a moderately elevated temperature. They dissolve in the moulding masses without special difficulty and cause no undesirable discolorations, even when used in comparatively large amounts. In general, it suffices for a sufficient stabilization to add to the polyester moulding masses the copper compounds in such amounts that the masses contain from about 0.1 to about 50 parts of copper per 1 million parts of the moulding mass.

Examples of the complex compounds to be used according to the present invention are the complexes of cuprous chloride and cuprous bromide with triethyl phosphite, 2,2′,2″-trichloroethyl phosphite, tripropyl, tributyl, tribenzyl, tricyclohexyl phosphite and triphenyl phosphite, as described, for example, in Gmelins Handbuch der anorganischen Chemie, System No. 60, part B, series No. 1, page 251 and page 365.

Unsaturated polyesters, solutions of which in monomeric, copolymerizable compounds can be stabilized with advantage according to the present invention, are all unsaturated polyesters in the usual sense, but especially those with a content of $\alpha,\beta$-unsaturated dicarboxylic acids, possibly with a content of radicals of other carboxylic acids, as well as with a content of preferably polyhydric alcohols.

Examples of carboxylic acids which may be used for the synthesis of the polyester resins include, for example, maleic acid, fumaric acid, itaconic acid, mesaconic acid, citraconic acid, succinic acid, glutaric acid, adipic acid, phthalic acid, tethachlorophthalic acid, hexachloroendomethyl-tetrahydrophthalic acid, trimellitic acid, benzoic acid, linseed oil fatty acid and castor oil fatty acid.

Examples of alcohols which can be used include, for example, ethylene glycol, diethylene glycol, propane-, butane- and hexane-diols, trimethylol-ethane, -propane, -butane, pentaerithritol, butanol and tetrahydrofurfuryl alcohol.

According to the present invention, air-drying moulding masses, for example, can also be stabilized with advantage which, apart from the radicals of $\alpha,\beta$-unsaturated dicarboxylic acids, also contain $\beta,\gamma$-unsaturated ether radicals, either as components of the polyesters, for example according to British patent specification No. 810,222, or as one of further mixture components, for example according to German patent specifications Nos. 1,067,210 and 1,081,222, and also unsaturated polyesters with a content of possibly cocondensed tertiary aromatic amines according to German patent specification No. 919,431.

Under the term "copolymerizable monomeric compounds" are to be understood the unsaturated copolymerizable compounds usual in polyester resin technology, with vinyl groups possibly substituted in the $\alpha$-position, or allyl groups possibly substituted in the $\beta$-position, for example, styrene, vinyl-toluene, divinyl-benzene, vinyl acetate, acrylic acid, and its esters, acrylonitrile, methacrylic acid and its corresponding derivatives, as well as allyl esters, such as allyl acetate, allyl acrylate, phthalic acid diallyl ester, triallyl phosphate and triallyl cyanurate.

The polyester moulding masses stabilized with the use of the copper compounds according to the present invention, can, in addition, also still contain conventional inhibitors.

The following examples are given for the purpose of illustrating the present invention, the parts being parts by weight:

*Example 1*

An unsaturated polyester with an acid number of 47, produced by the condensation of 152 parts of maleic anhydride, 141 parts of phthalic anhydride and 195 parts of propane-1,2-diol, and mixed with 0.045 part of hydroquinone, is dissolved in styrene to give a 65% solution. Different test samples of the polyester moulding mass obtained are each adjusted to a copper content of 2 p.p.m. by the addition of cupric naphthenate (test A) or, according to the present invention, of the complex compound of the formula [CuCl.P(OC$_2$H$_5$)$_3$] (test B). The properties of the moulding masses obtained are given in the following Table I, together with the properties of the original polyester moulding mass which contains no copper (test C).

TABLE I

|  | A | B | C |
|---|---|---|---|
| Colour of the moulding mass.* | Greenish discoloration. | Colourless | Colourless. |
| Storability at 60° C | 40 days | 40 days | 12 days. |

*Layer thickness, 3 cm.

*Example 2*

An unsaturated polyester with an acid number of 23, produced by the condensation of 882 parts of maleic anhydride, 1,332 parts of phthalic anhydride, 1,098 parts of ethylene glycol and 963 parts of trimethylol-propane diallyl ether in the presence of 0.43 part of hydroquinone, is dissolved in styrene to give a 50% solution. Different test samples of the resultant polyester moulding mass are adjusted to a copper content of 20 p.p.m. by the addition of cupric naphthenate (test A) or, according to the present invention, of the complex compound of the formula [CuBr.P(OC$_6$H$_5$)$_3$] (test B). The properties of the moulding mass obtained are given in the following Table II, together with the properties of the original polyester moulding mass containing no copper (test C).

TABLE II

|  | A | B | C |
|---|---|---|---|
| Colour of the moulding mass.* | Intense green discoloration. | Colourless | Colourless. |
| Storability at 80° C | 7.5 days | 7.5 days | 2.5 days. |

*Layer thickness, 3 cm.

*Example 3*

According to Example 1 of German patent specification No. 919,431 73 parts of adipic acid, 98 parts of maleic anhydride, 74 parts of phthalic anhydride and 125 parts of glycol are condensed under the usual conditions until 50% of the theoretical amount of water have distilled off. 7.5 parts of dihydroxyethyl-aniline are subsequently added and condensation continued at 200° C. until no more water distills over. The residual water is distilled off in a vacuum at 15 mm. Hg and at 200° C. After cooling to 160° C., there are added 0.25 parts of hydroquinone, and, after further cooling to 110° C., 140 parts of styrene.

Different test samples of the resultant polyester moulding mass are adjusted to a copper content of 25 p.p.m. by the addition of cupric naphthenate (test A) or, according to the present invention, of the complex compound of the formula [CuCl.P(OC$_4$H$_9$)$_3$] (test B). The properties of the moulding masses obtained are given in Table III, together with the properties of the original polyester moulding mass which contains no copper (test C).

TABLE III

|  | A | B | C |
|---|---|---|---|
| Colour of the moulding mass.* | Intense green discoloration. | Slightly yellowish. | Slightly yellowish. |
| Storability at 100° C | 24 hours | 27 hours | 10 hours. |

*Layer thickness, 3 cm.

We claim:
1. A polyester composition comprising mixtures of unsaturated polyester condensation reaction products of saturated and unsaturated dicarboxylic acids with polyols and monomeric olefinically unsaturated, copolymerizable compounds and containing a copper-containing complex of a member selected from the group consisting of cuprous bromide with a neutral phosphorous acid ester, said complex having a formula selected from the group consisting of

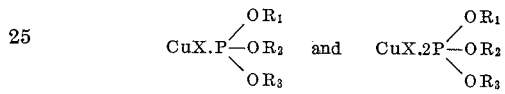

wherein X is a chloro or bromo atom and R$_1$, R$_2$ and R$_3$ are the same or different and stand for lower alkyl, cyclohexyl, phenyl or benzyl, said complex being present in an amount sufficient to stabilize the polyester composition against gelling during storage.

2. A polyester composition according to claim 1 wherein the complex is present in an amount such that the copper content in the composition is from about 0.1 to about 50 p.p.m.

3. A polyester composition according to claim 1 wherein the neutral phosphorous acid ester is a member selected from the group consisting of triethyl phosphite, 2,2',2''-trichloroethyl phosphite, tripropyl phosphite, tributyl phosphite, tribenzyl phosphite, tricyclohexyl phosphite and triphenyl phosphite.

References Cited

UNITED STATES PATENTS

| 3,028,360 | 4/1962 | Brooks et al. | 260—863 |
| 3,091,936 | 6/1963 | Lundberg et al. | 260—863 |
| 3,238,274 | 3/1966 | Allan | 260—863 |

FOREIGN PATENTS

| 371,576 | 9/1962 | Japan. |
| 1,098,712 | 2/1961 | Germany. |
| 1,290,707 | 3/1962 | France. |

OTHER REFERENCES

Gmelin, Handbuch Der Anorganschen Chemie, AUFL 8, System NR 60, Section B, pages 251 and 365.

MURRAY TILLMAN, *Primary Examiner.*

J. T. GOOLKASIAN, *Assistant Examiner.*